Patented Apr. 24, 1923.

1,453,080

UNITED STATES PATENT OFFICE.

HARRY A. PALLADY, OF SEATTLE, WASHINGTON.

SOLDERING FLUX.

No Drawing. Application filed August 21, 1922. Serial No. 583,366.

*To all whom it may concern:*

Be it known that I, HARRY A. PALLADY, a citizen of the United States, residing at Seattle, in the county of King and State of Washington, have invented a certain new and useful Improvement in Soldering Fluxes, of which the following is a specification.

My invention relates to improvements in soldering fluxes that are adapted for use to cause the fusion of metals with solder and the object of my invention is to provide a soldering flux that will fulfill all the requirements of the ordinary soldering flux and that will, in addition, cause solder to adhere firmly to metals, such as cast iron and the like, that have hertofore been difficult to fuse with solder.

My composition consists of a mixture of zinc chloride ($ZnCl_2$), tin amalgamated, and sal ammoniac (ammonium chloride $NH_4Cl$) all taken in ground or powdered form screened and thoroughly mixed together and moistened with sufficient glycerine or other similar liquid substance to form a paste that is readily applied.

In preparing the composition I prefer to use the ingredients in the following proportions by weight:

| | |
|---|---|
| Zinc chloride | 44.44% |
| Tin amalgamated | 33.33% |
| Sal ammoniac | 21.90% |
| Glycerine | .33% |

I have found, however, that satisfactory results may be obtained without the use of the glycerine or by the use of other liquid substances to moisten the above named ingredients.

The object of adding the moistening substance is to make it convenient to apply the flux to the parts to be soldered and also to keep the flux in good condition for use at all times.

This composition is relatively inexpensive to manufacture and will give excellent results when used for soldering cast iron, iron in various forms, or other metals that may be readily soldered by the use of other fluxes. The mixture is used in the ordinary manner by first applying the same to the part to be soldered and then applying the melted solder by means of any well known tools used for such purposes.

Obviously changes may be made in the proportions of the ingredients of my composition herein disclosed without departing from the spirit of my invention.

What I claim is:

A soldering flux comprising zinc chloride 44.44%, tin amalgamated 33.33%, sal ammoniac 21.90% and glycerine .33%.

In witness whereof, I hereunto subscribe my name this 5th day of August A. D. 1922.

HARRY A. PALLADY.